W. J. KEEP.
Base-Burning Stove.

No. 129,348.

12 Sheets--Sheet 1.

Patented July 16, 1872.

Witnesses.
A. H. Poole
John R. Young

Inventor,
Wm. J. Keep, by
Prindle and Co., his
attorneys

W. J. KEEP.
Base-Burning Stove.

No. 129,348

12 Sheets--Sheet 3.

Patented July 16, 1872.

Witnesses:
C. H. Poole.
John R. Young.

Inventor.
Wm. J. Keep, by
Prindle & Co. his
attys

W. J. KEEP.
Base-Burning Stove.

No. 129,348.

12 Sheets--Sheet 5.

Patented July 16, 1872.

W. J. KEEP.
Base-Burning Stove.

No. 129,348.

12 Sheets--Sheet 6.

Patented July 16, 1872.

Witnesses.
C. H. Poole
John R. Young

Inventor.
Wm. J. Keep, by
Prindle and Co.,
Attys.

W. J. KEEP.
Base-Burning Stove.

No. 129,348.

12 Sheets--Sheet 7.

Patented July 16, 1872.

Witnesses.
C. H. Poole.
John R. Young.

Inventor.
Wm. J. Keep, by
Prindle and Co. his
attys

W. J. KEEP.
Base-Burning Stove.

No. 129,348.

12 Sheets--Sheet 8.

Patented July 16, 1872.

W. J. KEEP.
Base-Burning Stove.

No. 129,348.

12 Sheets--Sheet 9.

Patented July 16, 1872.

W. J. KEEP.
Base-Burning Stove.

No. 129,348.

12 Sheets--Sheet 10.

Patented July 16, 1872.

Witnesses.
C. H. Poole
John R. Young

Inventor.
Wm. J. Keep by
Prindle and Joslin
Attys

AM. PHOTO-LITHOGRAPHIC CO. N.Y. (OSBORNE'S PROCESS)

W. J. KEEP.
Base-Burning Stove.

No. 129,348.

Patented July 16, 1872.

Witnesses.
H. Poole
John R. Young

Inventor.
Wm. J. Keep, by
Prindle and Co. his
attys

W. J. KEEP.
Base-Burning Stove.

No. 129,348.

12 Sheets--Sheet 12.

Patented July 16, 1872.

No. 129,348

UNITED STATES PATENT OFFICE.

WILLIAM J. KEEP, OF TROY, NEW YORK.

IMPROVEMENT IN BASE-BURNING STOVES.

Specification forming part of Letters Patent No. 129,348, dated July 16, 1872.

*To all whom it may concern:*

Be it known that I, WILLIAM J. KEEP, of Troy, in the county of Rensselaer, and in the State of New York, have invented certain new and useful Improvements in Heating-Stoves; and I do hereby declare that the following is a full, clear, and exact description thereof, reference being had to the accompanying drawing making a part of this specification, in which—

Figure 1:
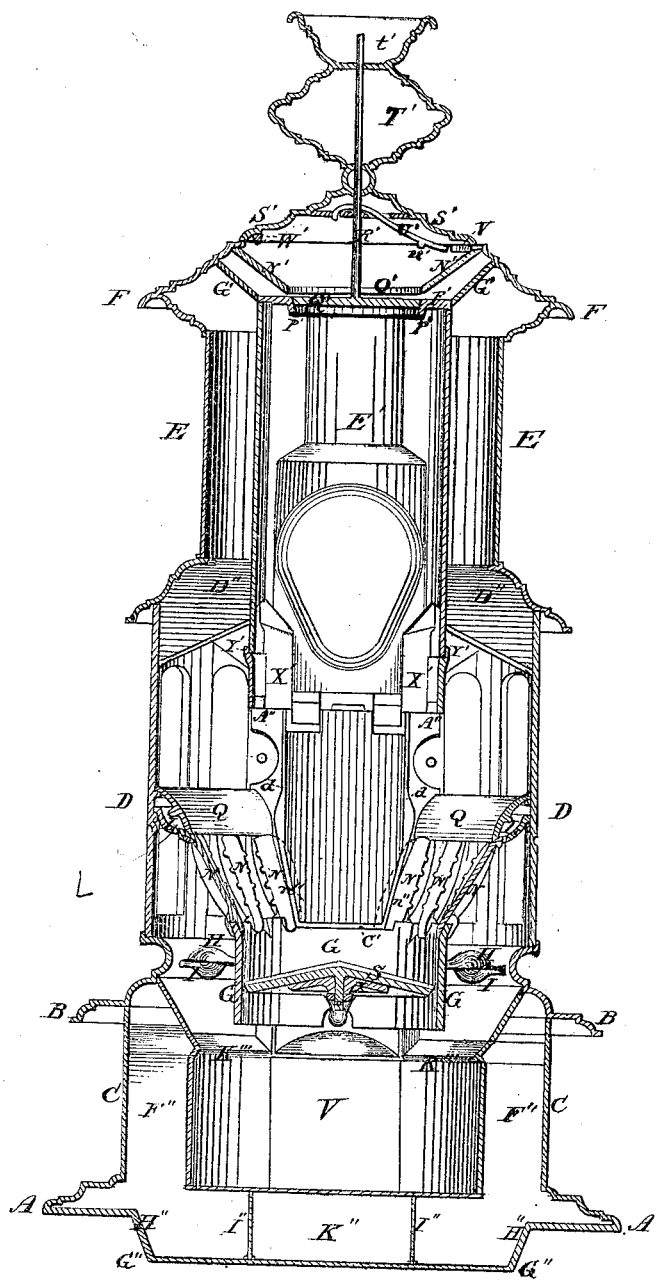
Figure 2:
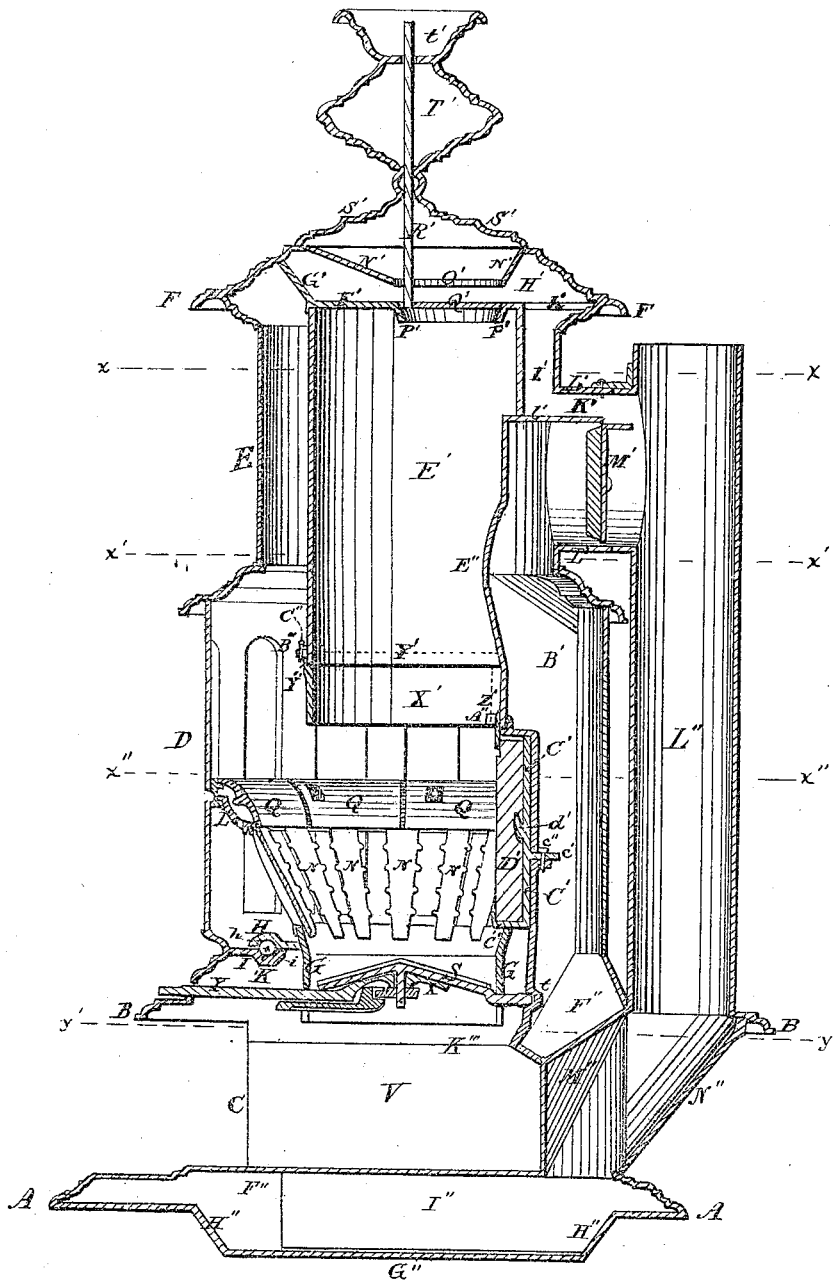
Figure 3:
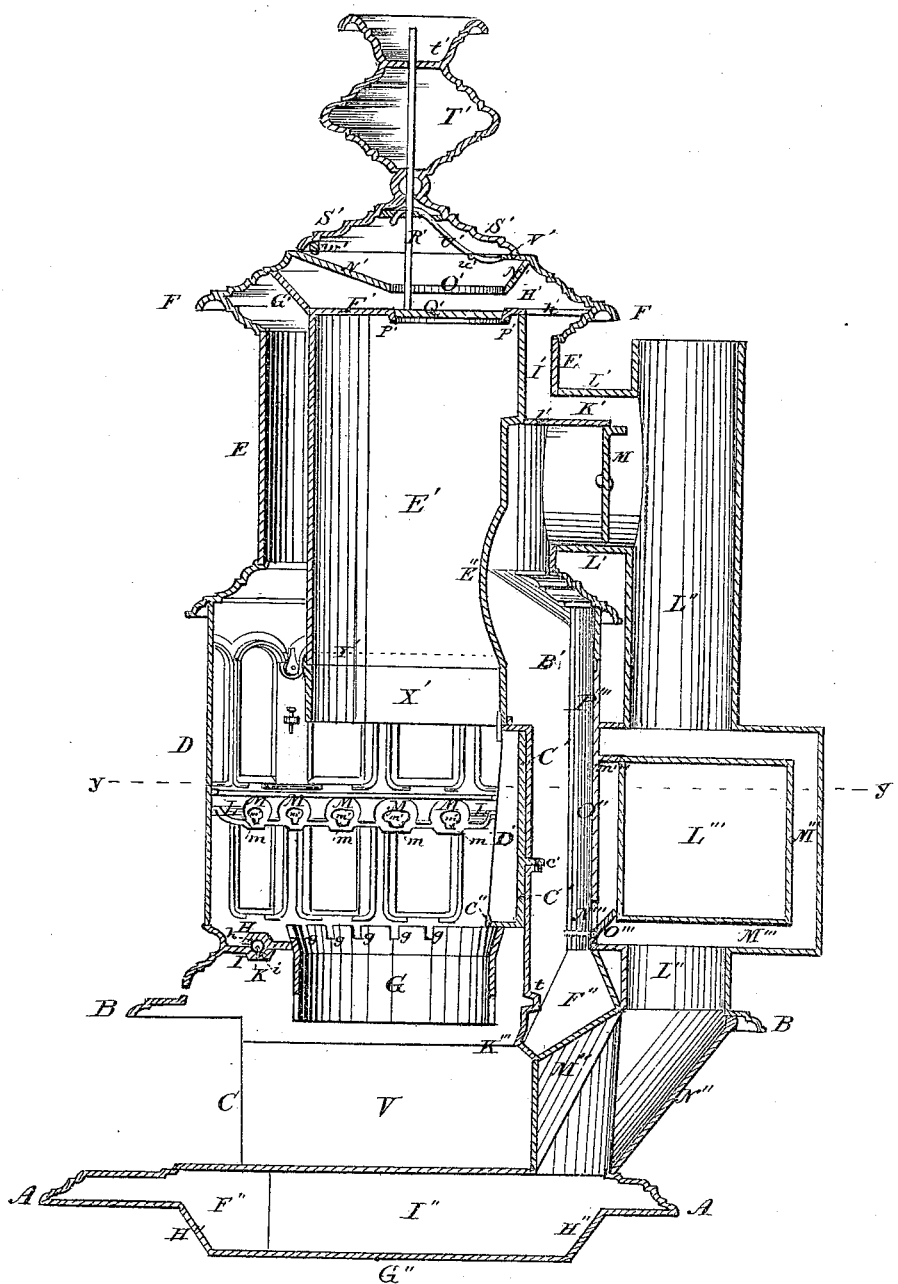
Figure 4:
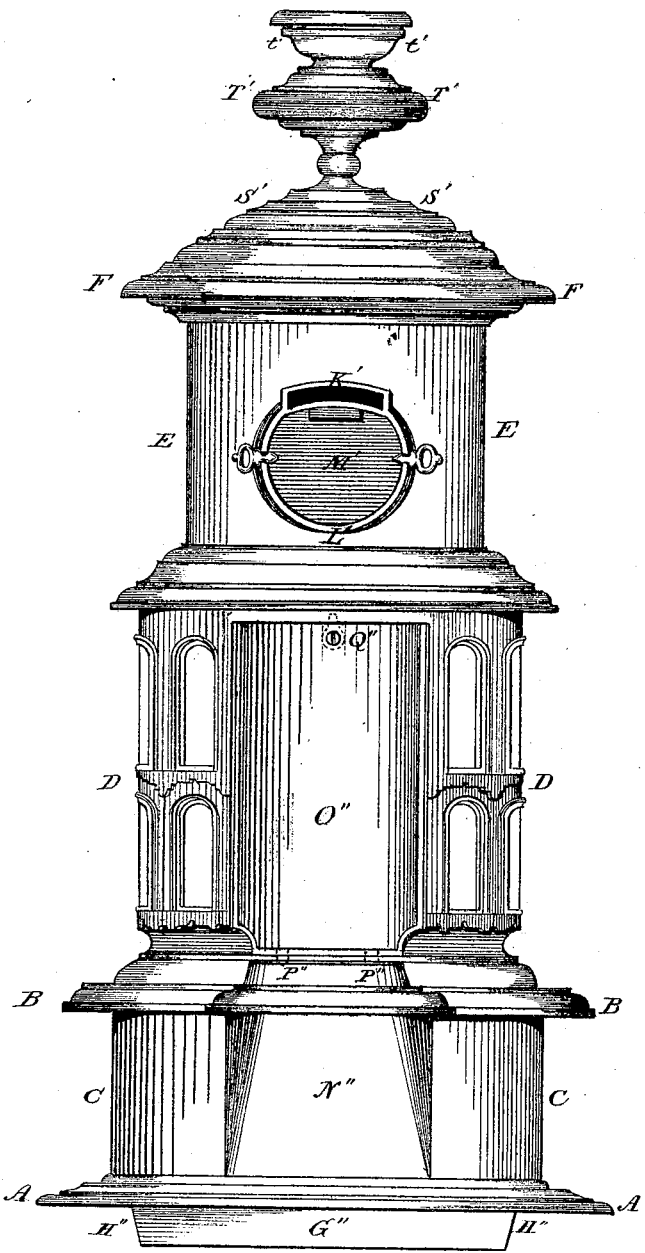
Figure 5:
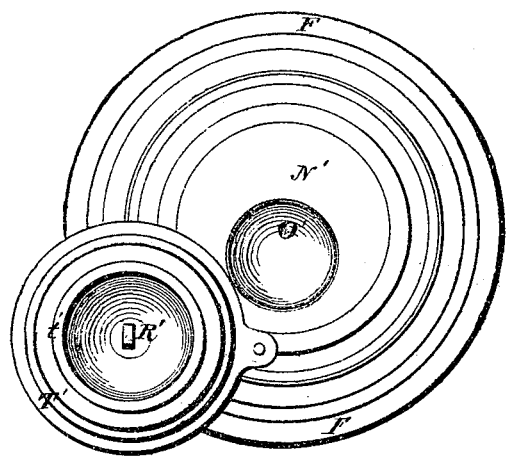
Figure 6:
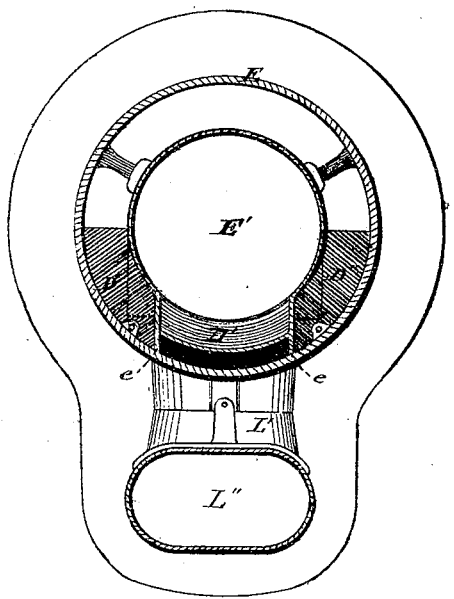
Figure 7:
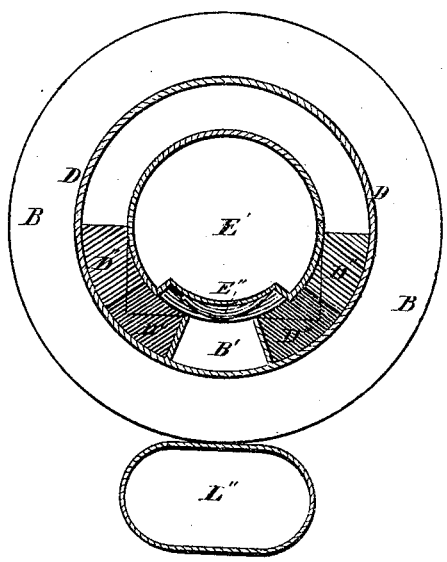
Figure 8:
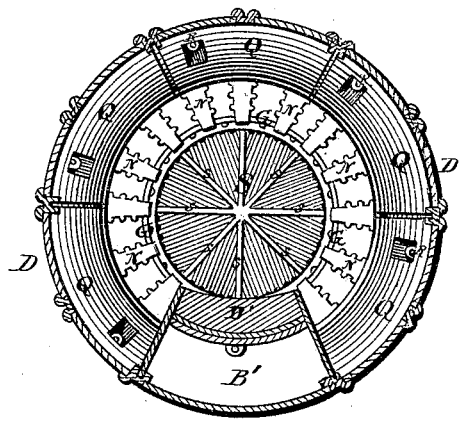
Figure 9:
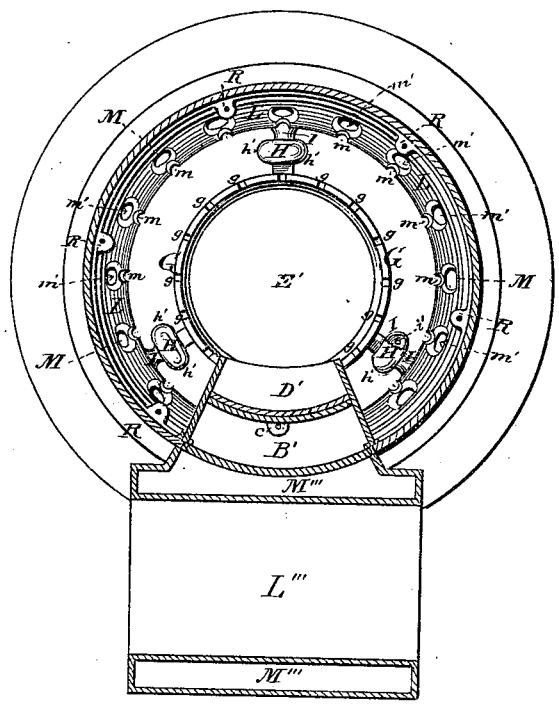
Figure 10:
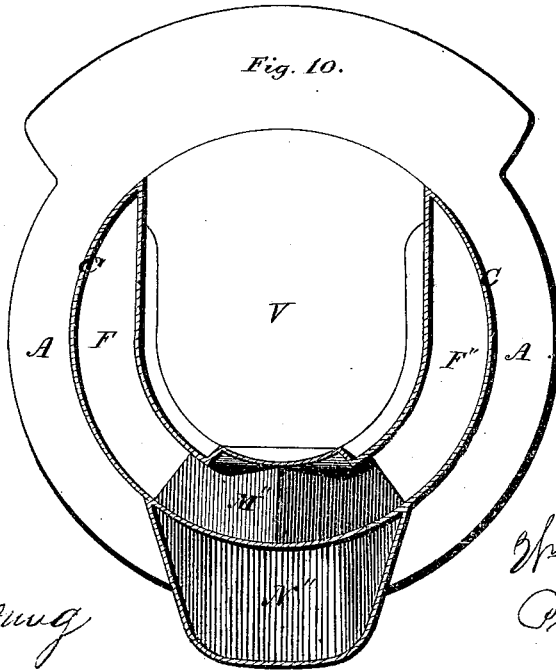
Figure 11:
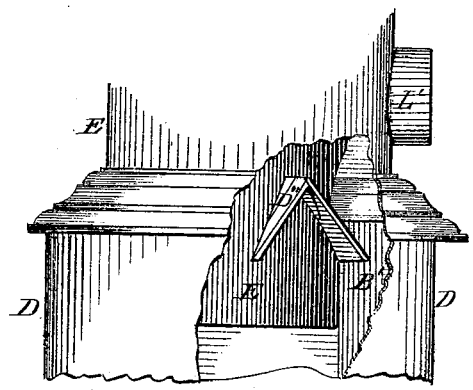
Figure 12:
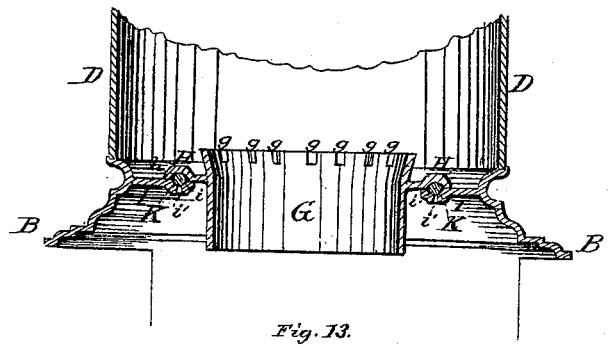
Figure 13:
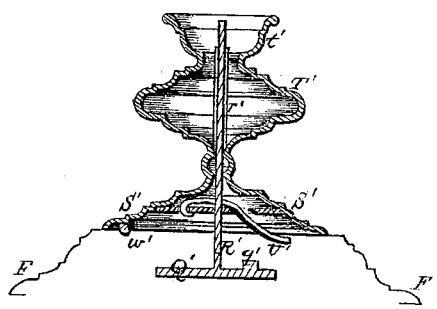
Figure 14:
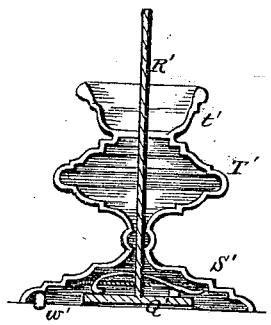
Figure 15:
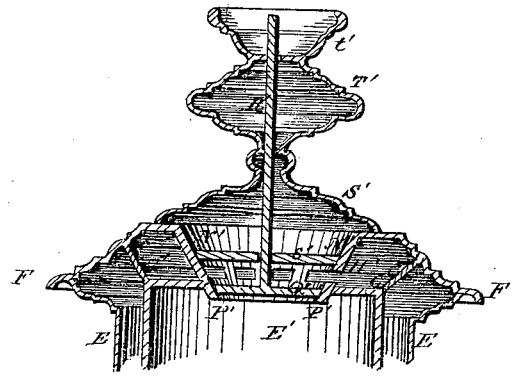
Figure 16:
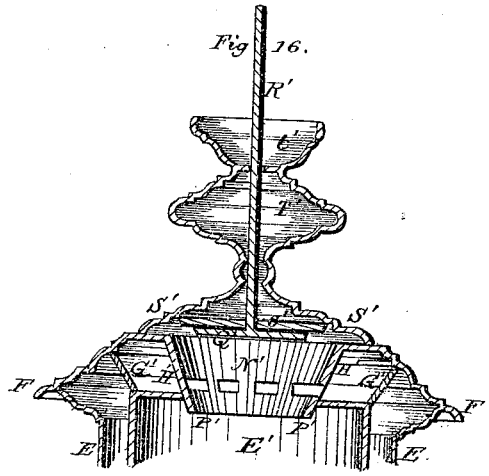
Figure 17:
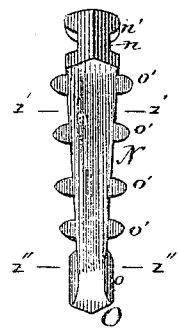
Figure 18:
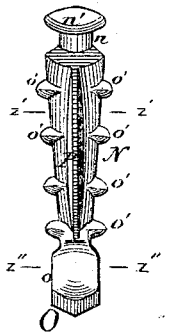
Figure 19:
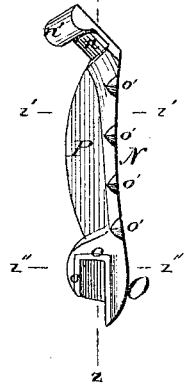
Figure 20:
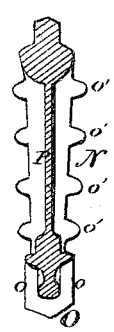
Figure 21:
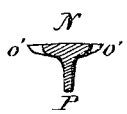
Figure 23:
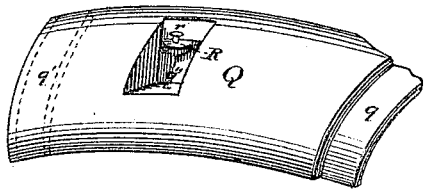
Figure 22:
Figure 24:
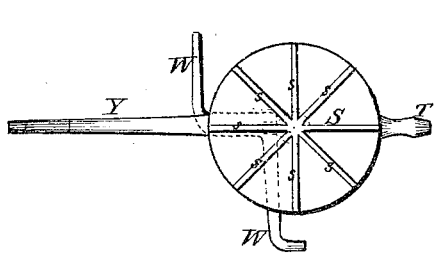
Figure 25:
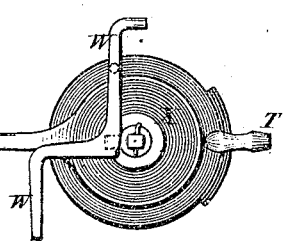
Figure 26:
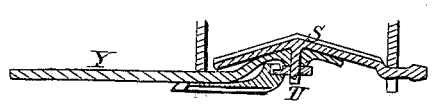
Figure 27:
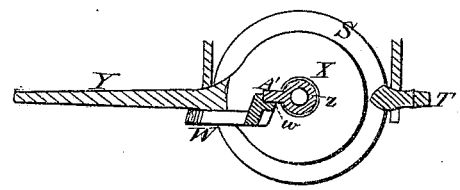
Figure 28:
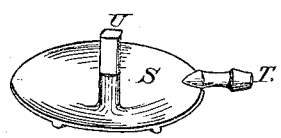
Figure 29:
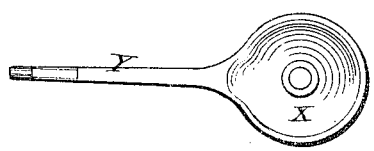
Figure 30:
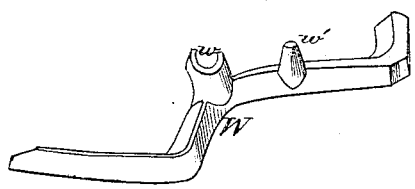
Figure 31:
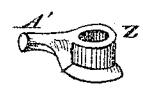
Figure 32:
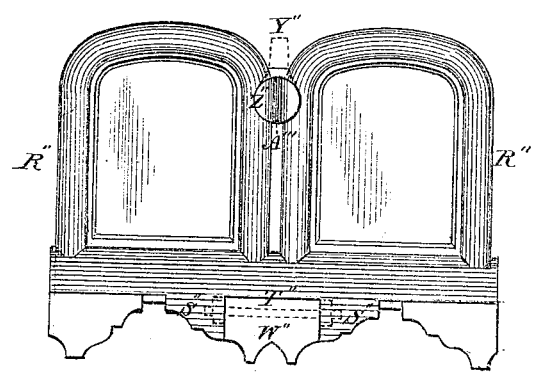
Figure 33:
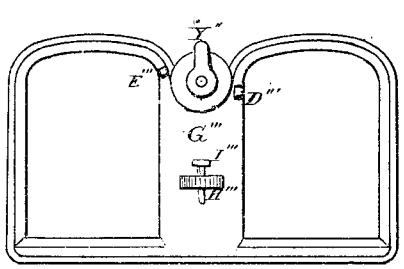
Figure 34:
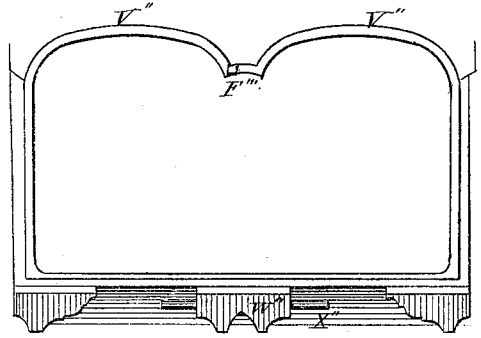
Figure 35:
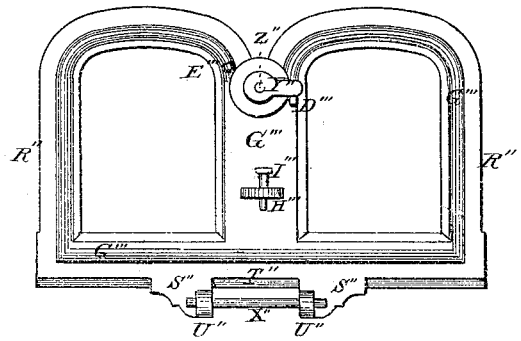
Figure 36:
Figure 37:
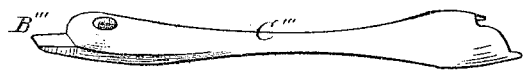

Figure 1 is a vertical central section of my stove looking toward the rear. Fig. 2 is a vertical central section of the same on a line passing from front to rear. Fig. 3 is a like view of said stove with the movable bars of the fuel-chamber removed and the back oven attached. Fig. 4 is a rear elevation of the stove with the back pipe removed. Fig. 5 is a plan view of the upper end of the casing with the urn and covers turned to one side. Fig. 6 is a cross-section on the line $x\ x$ of Fig. 2. Fig. 7 is a cross-section on the line $x'\ x'$ of same figure. Fig. 8 is a like view on the line $x''\ x''$ of Fig. 2. Fig. 9 is a cross-section on the line $y\ y$ of Fig. 3. Fig. 10 is a cross-section on the line $y'\ y'$ of Fig. 2. Fig. 11 is a partial side elevation of the stove with a portion of the casing broken away so as to show the deflecting flue-strip. Fig. 12 is a vertical section of the fuel-chamber on the line $y''\ y''$ of Figs. 8 and 9. Fig. 13 is a vertical section of the upper end of the stove, showing the means employed for locking the top cover in place. Fig. 14 is a like view of the same, showing the locking devices released from engagement. Fig. 15 is a vertical section of stove-top, showing a modification in the construction and combination of the covers. Fig. 16 is a like view of the same with the covers raised. Fig. 17 is a plan view of the inner side of one of the movable bars composing the sides of the fuel-chamber. Fig. 18 is a like view of the outer side of the same. Fig. 19 is a side elevation of said bar. Fig. 20 is a longitudinal section of the same on the line $z\ z$ of Fig. 19. Fig. 21 is a cross-section on the line $z'\ z'$ of Figs. 17, 18, and 19. Fig. 22 is a like view on the line $z''\ z''$ of same figures. Fig. 23 is a perspective view of a section of the lining of the upper edge of the fuel-chamber. Fig. 24 is a plan view of the upper side of the bed-plate and its supporting-frame. Fig. 25 is a like view of the under side of said parts. Fig. 26 is a central longitudinal section of the same with the bed-plate in a horizontal position. Fig. 27 is a like view of said parts with said bed-plate "dumped." Fig. 28 is a perspective view of the under side of the bed-plate detached from its frame. Fig. 29 is a plan view of the upper side of the dumping-bar. Fig. 30 is a perspective view of the supporting-frame of the bed-plate. Fig. 31 is a perspective view of the washer employed for insuring the radial position of the bed-plate. Fig. 32 is a front elevation of a mica door and its frame. Fig. 33 is an elevation of the inner side of said parts. Fig. 34 is a front elevation of the frame with its door removed. Fig. 35 is an elevation of the inner side of said door. Fig. 36 is a vertical section of said door through one of the mica openings, and Fig. 37 is a perspective view of the shaker-bar employed for operating the movable fuel-chamber and dumping bed-plate.

Letters of like name and kind refer to like parts in each of the figures.

My invention is an improvement upon a side-burning stove for which Letters Patent No. 101,368 was granted to me on the 29th day of March, 1870, and reissued May 16, 1871, No. 4,386; and it consists, principally, in a stove having the upper or supply end of its magazine separated from the air of the apartment by means of two covers, between which is a chamber for the escape of gas, when said covers are so combined as that the inner cover must be opened before the outer cover can be removed, substantially as and for the purpose hereinafter specified. It consists, further, in an exterior cover for the upper end of the casing which can only be removed after an interior cover is raised and which, when thus removed, carries with it said interior cover, substantially as and for the purpose hereinafter shown. It consists, further, in an exterior and an interior cover, so combined and arranged as that when the former is moved edgewise the latter is carried in the same direction, substantially as and for the purpose hereinafter set forth. It consists, further, in the peculiar arrangement of covers and of the upper end of the stove casing, by means of which, when opened, the inner cover is prevented from dropping downward, substantially as and for the purpose hereinafter shown and described. It consists, further, in an exterior and an interior cover, when so constructed as that the closing of the former will cause the latter to close automatically, substantially as and for the purpose hereinafter specified. It consists, further, in the square or rectangular rod employed for lifting the inner cover, substantially as and for the purpose hereinafter shown. It consists, further, in a magazine provided with a vertically-removable cover, when the opening thus closed is principally in rear of the transverse center of said magazine, substantially as and for the purpose hereinafter set forth. It consists, further, in the latch employed for locking the upper cover in place until the lower cover is raised, substantially as and for the purpose hereinafter shown and described. It consists, further, in so combining the locking-latch and lower cover as that the raising of the latter shall release the former, substantially as and for the purpose hereinafter specified. It consists, further, in the peculiar construction of the urn attached to the upper or exterior cover, and its combination with the lifting-rod of the lower cover, substantially as and for the purpose hereinafter shown. It consists, further, in a chamber situated between the cover of the upper end of the magazine and the cover of the stove-casing, and connected with the exit-flue, when said chamber is disconnected from the combustion-chamber, substantially as and for the purpose hereinafter specified. It consists, further, in a chamber so arranged above the magazine of a revertible flue-stove as that the exit-flue shall produce a constant suction, so as to remove therefrom all escaping gas or entering air, substantially as is hereinafter shown. It consists, further, in the contracted openings above and below the exhaust-chamber, substantially as and for the purpose hereinafter specified. It consists, further, in so combining the funnel with the upper open end of the magazine and with the cover for the latter as to cause said cover, when being raised, to close the lower end of said funnel and for an instant cause the draught of the exhaust-chamber to be entirely from said magazine, substantially as and for the purpose hereinafter shown and described. It consists, further, in the peculiar construction of the cross-pipe employed for connecting the upper portions of the stove with the rear vertical flue, by means of which construction two independent flues are formed for connecting the exhaust and combustion chambers with the exit-flue, substantially as is hereinafter specified. It consists, further, in the peculiar construction of the damper within the cross-pipe, by means of which the direct draught from the combustion-chamber may be closed without interference with the exhaust-flue, substantially as is hereinafter shown. It consists, further, in a damper for closing the direct draught of the stove when said damper is provided with two handles, so as to be operated from either side, substantially as is hereinafter set forth. It consists, further, in the peculiar construction of the rear side of the magazine, by means of which the size of the direct-draught flue is increased, substantially as is hereinafter specified. It consists, further, in the flue-strips placed between the outer casing and magazine, and at the upper end of the diving-flue, for the purpose of throwing the heated gases toward the front side of the stove, substantially as is hereinafter shown. It consists, further, in the peculiar shape of said flue-strips, by means of which ashes are prevented from lodging thereon, substantially as is hereinafter set forth. It consists, further, in the construction of the division-plate at rear of ash-pit, by means of which the descending currents of heated gases are diverted to each side of the base, and also by means of which a return-flue is formed between the bottom and exit flues, substantially as is hereinafter shown and described. It consists, further, in the removable panel in the outside of the back or diving-flue for the purpose of affording access to the same, substantially as is hereinafter specified. It consists, further, in an oven applied to and combined with the rear side of a stove, and connected directly with the diving-flue so as to cause the heated escaping gases to pass into and around said oven instead of entering the base of said stove, substantially as and for the purpose hereinafter shown. It consists, further, in an oven combined with and arranged upon the rear side of a stove, when said oven is so constructed that, by turning a damper, the heated escaping products of combustion may be caused to pass directly into and around the flue of said oven from the diving-flue, or may be caused to enter the base of said stove and then pass into and around said oven, substantially as and for the purpose hereinafter set forth. It consists, further, in the extra plate placed between the front side of the oven and the rear diving-flue, substantially as and for the purpose hereinafter shown and described. It consists, further, in the construction of the lining of the upper edge of the fuel-chamber, by means of which the bearings of the movable bars are covered and protected from heat, dirt, or ashes, substantially as is hereinafter specified. It consists, further, in the construction of the lining for the upper edge of the fuel-chamber, by means of which one end of each section passes beneath and is held in place by the contiguous end of the next section so as to permit of longitudinal expansion or contraction without forming openings for the passage of air or dirt, substantially as is hereinafter shown. It consists, further, in the means employed for securing the lining in place, substantially as and for the purpose hereinafter set forth. It consists, further, in the construction of the bearing-ring for the upper ends of the movable bars, substantially as and for the purpose hereinafter shown and described. It consists, further, in the openings provided in and through the lower sides of each socket or bearing for the upper ends of the movable bars, substantially as and for the purpose hereinafter specified. It consists, further, in the peculiar construction of the journals at the upper ends of the movable bars, by means of which, when the lower ends of said bars are caused to vibrate around the circle of the slag-pit, said journals shall revolve within their bearings, substantially as is hereinafter shown, It consists, further, in the peculiar construction of the axial bearings of the movable bars, by means of which, when the lower ends of said bars are vibrated around the circles of the slag-pit, each side of the same shall be alternately thrown forward and back, substantially as and for the purpose hereinafter set forth. It consists, further, in the peculiar construction of the lower ends of the movable bars, by means of which said bars are connected to or with the upper edge of the slag-pit, and ashes and coal are prevented from getting into the bearings, substantially as is hereinafter shown and described. It consists, further, in the construction of the upper ends of the movable bars, by means of which said ends are retained within their sockets or bearings, substantially as is hereinafter specified. It consists, further, in the construction of the movable bars and their combination with the slag-pit so as to permit of expansion or contraction without derangement of or injury to said parts, substantially as is hereinafter shown. It consists, further, in a fuel-chamber capable of a horizontally rotary motion, in combination with a solid bed-plate, substantially as and for the purpose hereinafter set forth. It consists, further, in the construction of the rear movable bar, by means of which coal and cinders are prevented from getting between the same and the descending flue, substantially as is hereinafter shown and described. It consists, further, in the lining of the descending flue, by means of which the rear bars are covered and protected, substantially as is hereinafter specified. It consists, further, in the brick or extra lining of the descending flue, substantially as and for the purpose hereinafter shown. It consists, further, in the means employed for securing the extra lining in place to or against the descending flue, substantially as is hereinafter set forth. It consists, further, in the means employed for securing the brick in place in front of the descending flue, substantially as is hereinafter shown and described. It consists, further, in the means employed for securing in place the nose of the magazine, substantially as and for the purpose hereinafter shown. It consists, further, in a fuel-chamber capable of a horizontally rotary motion, and resting upon and wholly or in part supported upon balls, substantially as and for the purpose hereinafter specified. It consists, further, in the peculiar construction of the lower cup or bearing for the balls, by means of which ashes are prevented from collecting therein, substantially as is hereinafter shown. It consists, further, in the peculiar construction of the upper cup or bearing for the balls, substantially as and for the purpose hereinafter set forth. It consists, further, in the slag-pit, so constructed as to project below the bed-plate, substantially as and for the purpose hereinafter shown and described. It consists, further, in the peculiar construction and arrangement of the bearings of the bed-plate, substantially as and for the purpose hereinafter specified. It consists, further, in the peculiar construction of the bar employed for moving the fuel-chamber and for dumping the bed-plate and its combination with said parts, substantially as is hereinafter shown. It consists, further, in the construction of the combined washer for insuring the horizontal position of the bed-plate and bearing upon which said bed-plate rotates vertically, substantially as and for the purpose hereinafter set forth. It consists, further, in the peculiar construction of the supporting-frame or cross-bar upon which the bed-plate rests, by means of which said bed-plate is permitted to pass from a horizontal to a vertical position, substantially as and for the purpose hereinafter shown and described. It consists, further, in the projection upon the cross-bar, by means of which the horizontal position of the bed-plate is insured, substantially as is hereinafter specified. It consists, further, in the extended rear portion of the bed-plate, substantially as and for the purpose hereinafter set forth. It consists, further, in a horizontally stationary bed-plate provided with a serrated edge, in combination with a fuel-chamber capable of a horizontally rotary motion, and provided, upon its contiguous portions with corresponding serrations or projections, substantially as and for the purpose hereinafter shown and described. It consists, further, in the projecting ledge formed upon the sides of the ash-pit at or near its upper side, substantially as and for the purpose hereinafter specified. It consists, further, in the peculiar construction of the hinge of the mica doors, substantially as and for the purpose hereinafter shown. It consists, further, in the employment of a hollow lug upon the side of the stove-casing, substantially as and for the purpose hereinafter set forth. It consists, further, in the peculiar shape of the lower bar of the mica frames, by means of which ashes are prevented from lodging thereon, substantially as is hereinafter shown and described. It consists, further, in a mica section of dropping doors situated opposite a basket-grate, when said grate is placed above a ring or slag-pit, substantially as and for the purpose hereinafter shown. It consists, further, in the peculiar construction of the exterior portion of the turn-keys employed for securing in position the upper sides of the mica doors, substantially as and for the purpose hereinafter set forth. It consists, further, in a stove-shaker provided upon one end with a key for unlocking a turn-key, substantially as is hereinafter shown and described. It consists, further, in the lugs upon the mica doors for the purpose of prescribing the radial motion of the turn-keys, substantially as is hereinafter specified. It consists, finally, in the lugs secured to and projecting from the door-jambs, by means of which the turn-keys are prevented from passing beyond the locking point, substantially as is hereinafter shown.

As this invention applies more especially to details of construction, while the general features of the stove are the same as have been fully set forth in the patents hereinbefore named, it is not deemed requisite in the specification to give so minute and specific a description of parts as would otherwise be necessary.

In the annexed drawing, A represents the bottom plate and B the top plate, between which is inclosed the usual side or vertical plate C of the base. From the top plate B extends upward a straight cylindrical section, D, which contains two rows of mica windows, while said section is, in turn, surmounted by another smaller close section, E, which is inclosed at its upper end by means of a top plate, F, the whole forming the exterior casing of the stove. The slag-pit or lower end of the fuel-chamber is formed of a short cylinder or ring, G, which is placed centrally within the lower end of the mica section and within the upper portion of the base, and is supported by means of three lugs, H, which extend radially and horizontally outward from equidistant points around the periphery of said ring, and rest upon corresponding lugs I that are secured to and extend inward from said casing. Within the contiguous portions of the lugs H and I are formed semicircular sockets $h$ and $i$, respectively, which unitedly, and in a radial direction, form a circular bearing that receives and contains a ball, K, said ball being slightly larger than the space between the upper and lower side of said bearing, so as to prevent the lugs from touching. The bearings $h$ and $i$ are extended laterally and in a line concentric to the periphery of said ring, so as to permit the ball K to have therein a certain degree of motion. The upper lug H is provided with overlapping wings $h'$, which cover the lower lug I and prevent ashes from falling upon the same, while said lower lug is provided at each end of its socket $i$ with an opening, $i'$, which extends downward and outward, and permits the escape of any dust that may settle within said socket, which dust would otherwise interfere with and prevent the free motion of the ball. As thus arranged a rolling bearing is formed for the ring or slag-pit which is comparatively frictionless, and permits the same to be partially rotated in a horizontal direction when desired. Secured to or within the section D, midway between the mica doors, is a metal ring, L, which extends horizontally inward, and then downward and inward, as shown in Figs. 1 and 3, and is provided within said sloping portion with a series of semi-spherical sockets, M, from each of which extends downward and inward a semi-cylindrical opening, $m$, the metal of said ring being extended downward at such points, so as to form said openings or bearings. The bars N, which form the sides and front of the fuel-chamber and extend between and are connected with the rings G and L, are each provided at their upper ends with a semi-cylindrical journal, $n$, which corresponds in size and shape to the bearings $m$, and has such an angle with relation to the line of the bar (preferably about forty-five degrees) as to cause it to be rotated smoothly within said bearing by the united concentric and lateral motions given to the lower end of said bar by the ring G. A head or collar, $n'$, formed upon the outer end of the journal $n$, fits into the socket M, and insures the relative positions of said parts by preventing the withdrawal longitudinally of said journal from its bearing. The sockets M are each provided with an opening, $m'$, through which dust or ashes may escape, instead of remaining to obstruct the operation of the movable bars. The lower end of each bar N is extended rearward, as seen in Figs. 17 to 20, and has a sufficient thickness to cause it to loosely fill the opening $g$ provided for its reception within the upper edge of the ring G. A flange, $o$, extending laterally outward from the sides of the bearing-end O, incloses the inner and outer sides and top of the opening $g$, and prevents the entrance thereto of ashes or cinders; and also holds said bar in horizontal position within said opening. Upon the inner side the bar N extends downward below the opening $g$, and protects the lower portion of the latter from obstructions. The lower end of said bar does not extend quite to the bottom of its notch within the ring, sufficient space being left for the longitudinal expansion of the former without causing it to bind within its bearings. The body of the movable bar is constructed, preferably of a half-round form, transversely, and has extending laterally outward from its edge a series of spurs, $o'$, which partially inclose the space between the same and the contiguous bars. An exteriorly-shaped rib, P, secured upon and extending longitudinally along the outside of the bar at its transverse center, strengthens said bar without obstructing in any degree a view of the interior of the fuel-chamber. As thus constructed and arranged, by giving to the ring or slag-pit a semi-rotary movement in opposite directions upon its bearings, the lower ends of the bars will be caused to move back and forth around the circle described by said ring, while their sides will be alternately thrown forward and back, and in an opposite direction from the adjacent bars, so as to increase their rasping or cleaning action upon the contents of the fuel-chamber. The upper or journal ends of the movable bars are protected and locked in position vertically, by means of a metal lining, Q, which extends from the casing above the supporting-ring L, inward and downward to the lower side and inner edge of the same, so as to leave between said parts a sufficient space to insure the free action of said bars. In order that the expansion and contraction of the lining Q may not affect its position, or the adjustment and operation of the adjacent portions of the stove, it is constructed in sections, each of which is provided upon one end with a tenon, $q$, and within the opposite end and rear side with a corresponding recess, $q'$, so that when said sections are in place, the tenoned end of one shall pass beneath, and be held in lateral position by means of the recessed end of the adjacent section. By leaving a sufficient space between the ends of the sections, and giving to their tenons such length as will cause the latter to extend beneath the adjacent section when cold, the expansion caused by the heat of the burning fuel will neither displace said lining or in any degree uncover the parts protected by the same. The lining Q is secured in position by means of a series of lugs, R, one of which extends inward from the casing through a corresponding opening formed in each section of said lining, and is provided with a vertical opening which receives a small nail, $r$. In order that the lugs R may not extend beyond the surface of the lining, a recess, $q''$, is provided for its reception upon the inner upper face of each section. The bed-plate S is imperforate, and made somewhat conical, with its upper side convex and its lower side correspondingly concave. An arm, T, extends downward from and to a short distance below the rear edge of said bed-plate, and thence horizontally rearward, so as to furnish an axial bearing for the rear side of said part while from the center of the same extends vertically downward a second arm or stud, U, which serves to connect said plate to or with its supporting and dumping devices. Resting within suitable bearings formed upon opposite sides of the ash-pit V, is a frame-bar, W, which has the general form shown in Fig. 30, and is provided at its average longitudinal center with a semicircular socket or bearing, $w$, open at one end. When placed within the stove, said frame occupies such a position as to bring its bearing $w$ in a line with the lateral center of the stove, and somewhat in front of its center from front to rear. A stud, $w'$, extends vertically upward from said frame at a point midway between its bearing and one end, the object of which will be hereinafter explained. Encircling loosely the arm U of the bed-plate, is a circular metal plate, X, which conforms in shape to the lower side of said bed-plate, and has a diameter equal to about one-half the diameter of the same. Extending downward and then horizontally outward from one side of said plate is a bar, Y, which, when placed opposite to and in a radial line with the arm T, corresponds with the latter in horizontal position. A washer, Z, provided with a radially and horizontally projecting arm, A', is secured rigidly upon the arm U, in such a position as to confine the plate Y in place, and to bring said arm A' directly opposite to and in a line with the arm T. As thus constructed, the bed-plate is placed within the slag-pit or ring G, with the arm T extending through a suitable opening rearward, into a socket or bearing, $t$, formed in the rear side of the ash-pit, the bar Y extending forward through suitable openings in said ring and in the casing of the stove, while the fixed arm A' rests within the bearing $w$ of the frame-bar W, and said bed is maintained in a horizontal position by means of the stud $w'$ of said frame-bar. If, now, the bar Y be turned to the left within its bearing the bed-plate will be correspondingly rotated in a vertical plane upon the arms T and A', which form axial bearings for the same, while, when said bed-plate occupies a horizontal position, if said bar Y be moved laterally in opposite directions, its inner end will rotate freely around the arm U without in any degree affecting the position of said bed-plate, but by such motion the slag-pit and movable bars composing the fuel-chamber will be shaken. It will be seen that, as the bed-plate is placed entirely above its pivotal bearings, the operation of dumping throws it to one side so as to cause its lower face to bear against and be maintained in a vertical position by means of the central portion of the frame-bar W, said bed-plate thus having liberty to rotate in a vertical plane just one-fourth of a revolution. The upper side of the bed-plate S is provided with a series of ribs, $s$, which, extending radially outward from the center, increase its strength and prevent such close contact of the burning fuel as would cause injury. If desired, the contiguous edges of the ring or slag-pit and of the bed-plate may be serrated so as to form grinding-surfaces, between which slate and slag may be reduced in size sufficiently to permit them to pass freely downward between said parts. As it is designed that combustion shall take place in front and at the sides of the fuel-chamber rather than at its rear, the bed-plate has its rear side extended outward, so as to substantially close the space between the same and the contiguous portion of the ring forming the slag-pit and prevent air from entering said fuel-chamber from that point. It will be seen that the ring G, which forms the slag-pit, extends downward to a considerable distance below the bed-plate S, the object of which construction is to secure additional strength for said part. Situated immediately in rear of the fuel-chamber, and within the casing of the stove, is a diving-flue, B', which connects the base-flues and combustion-chamber, and forms a back for said fuel-chamber. As said flue is constructed with a vertical front, it becomes necessary to add to its forward side a metal plate or lining, C', which, while conforming to the face of said flue downward to a point just below the upper edge of the fuel-chamber, from thence is so inclined inward and downward that the flange $h''$, which projects from the contiguous bars N, may pass behind it. The sides of the lining C' are inclined inward and downward upon lines corresponding to the edges of the movable bars, and, as said lining at that point is placed immediately outside of the circle of said bars, those of the latter adjacent to the former pass beneath or in rear of the same when the fuel-chamber is rotated so as to move said bars rearward. In order that a close sliding joint may be produced between the rear bars and the lining said bars are each provided with a wing, $n''$, which extends behind said lining to a sufficient distance to enable said bar to be withdrawn during the operation of shaking the fuel-chamber without leaving an opening between its edge and the contiguous edge of said lining. The lining C' is secured in place upon the face of the flue B' by means of a lug, $c'$, which is attached to said lining and extends horizontally rearward through a corresponding opening provided in said flue front, the outer end of said lug being provided with an opening which receives and contains a nail or pin, $c''$. In order to prevent injury to the flue B' and to prevent the rearward passage of heat from the fuel-chamber a brick lining, D', is fitted to or upon the front side of the metal lining-plate C', where it is held in position between suitable inward-projecting flanges $d$ attached to the sides and lower end of said lining and the lower end of the magazine, (as shown in Fig. 2,) or by means of an inward and upward projecting ledge, $d'$, which is secured upon said lining B' midway between its upper and lower ends and fits into a corresponding opening formed in the rear side of said brick. In either case the brick is first placed in position and the metal lining is then secured in place, after which said brick can only be removed as inserted, its upward motion being prevented by the lower end of the magazine. The magazine E' is partially inclosed at its upper end by means of a plate, F', and the latter and said magazine connected to or with the top plate F of the casing by means of a flue-strip, G', which flares outward from the upper end of said magazine to its point of union with said plate, except at the rear side, where said flue-strip extends outward to the casing of the stove, so as to form an opening, H', having nearly parallel sides, horizontally, and extending between said plate F', (which, also, extends rearward,) and said top-plate F. From immediately beneath the opening H' to a point just below the upper side of the exit-flue the wall of the magazine is extended rearward nearly to the casing E upon lines corresponding, vertically, to or with those of the flue-strip G', while from the outer vertical corners and lower end of the offset thus formed extends rearward to said casing E a flange, $e'$, which forms between said magazine and casing a flue, I', which communicates through an opening, $h$, at its upper end with said opening or flue H', and at its lower end with a horizontal passage or flue, K', formed within and extending outward through said casing E, said flue K' being placed immediately over the cross-pipe L' and separated therefrom by means of a division-plate, $l'$. In order to accommodate the flue K' the upper side of the flue L' is flattened, (as shown in Fig. 4,) and the damper M' correspondingly shaped, so that while capable of substantially closing said lower flue said upper flue shall at all times remain unobstructed. The flue H', I', and K' thus formed affords direct communication between the upper end of the magazine and the exit-flue of the stove, and causes all escaping gases to be immediately drawn into the latter instead of escaping into the room; but in order that the draught of said flues shall be made to act more especially upon the upper end of said magazine, a second flue-strip, N', is secured to or upon the under side of the top plate F and extends downward and inward to within a short distance of the upper end of the magazine, the lower open end O' of the funnel-shaped space formed by said strip corresponding in size and shape to or with the opening P' of said magazine, which latter opening is placed in rear of the center, or at the rear side of said magazine. In order that the damper M' may be more conveniently operated, a handle of usual form is secured to and extends outward from each side, and enables said damper to be adjusted from either side of the stove, instead of, as heretofore, from the right-hand side only. The open end P' of the magazine is inclosed by means of a corresponding cover, Q', which is removed by being raised vertically, by a rod, R', to or beyond the upper side of the top plate F', during which operation, and while passing through the opening O', an interval occurs when the magazine is uncovered and exposed to the draught of the exhaust-flue H', I', and K', (which extends from the exit-flue to and entirely around the upper end of said magazine,) while communication between said exhaust-flue and the space above the flue-strip N' is almost entirely cut off, by which means any gases accumulated within said magazine would be harmlessly drawn into the chimney before a passage could be opened to the air of the room. The upper open end of the stove-casing is inclosed by means of a cover, S', which is, preferably, pivoted at one side so as to swing horizontally outward, while upon said cover is placed an arm, T', the construction of which will be hereinafter described. The rod R' must necessarily pass upward through the center of the cover S' and its urn, but as said parts do not coincide, vertically, with the cover O' of the magazine, said rod is secured to or within the front side of the latter and the relative radial positions of the parts insured by giving to said rod and the openings for its passage a square form. In order to prevent injury to the cover Q' or rod R' by moving the top cover before said parts are raised, a latch, U', is pivoted to or within the lower side of said top cover and extends downward and outward, with its free end immediately below the upper edge of the top plate F, in which position the end of said latch bears against and engages with a lug, V', secured to or upon the upper side of the flue-strip N'. As the latch and lug are in a line with the lateral movement of the top cover it will be seen that they will effectually arrest the motion of the same, while, by raising the outer end of said latch, it will pass from engagement with said lug into the concavity of said cover and leave the latter free to move outward. A lug, $u'$, secured to and projecting downward from the latch U', receives the cover Q' as it is raised, and causes said latch to be released from engagement with its lug at the precise instant that said cover passes above the top plate, by which arrangement no side motion of said parts can be made until each occupies the exact position designed. Upon turning the top cover to one side the magazine-cover rests upon and is supported by the top plate until said parts are again returned to a central position, when the magazine-cover and latch automatically drop to place. Another advantage arises from this arrangement and combination of the covers and latch, as it affords an interval between the uncovering of the magazine and the removal of the top cover, during which the accumulated gases are certain to be drawn into the chimney instead of escaping into the room. A stud, W', projecting downward from the top cover, upon the side directly opposite to the outer end of the latch, engages with the edge of the opening of said top cover, so as to limit its inward motion, and with the lug V', when said cover is turned outward so as to limit motion in such direction. The urn T' has its upper end contracted, as shown, so as to prevent water from slopping over when the top cover is turned suddenly to one side; and in order that said urn may be readily filled, a funnel-shaped top, $t'$, is affixed. As, however, the operation of the contracted mouth of the urn is the same whether the funnel attachment is used or omitted, I do not confine myself to their joint use. In order that the lifting-rod R' may have free passage through the urn without interfering with its capacity to contain water, a tube, $r'$, is secured within the lower end of the latter and extends vertically upward through its center to or near the upper end of the funnel.

In Figs. 15 and 16 is shown another arrangement of the covers, by means of which the sidewise swinging top cover can be dispensed with, and in its place substituted a circular cover, $s'$, which fits into an inward and downward sloping seat, and is removed by raising the lower cover Q', the rod of which passes upward through a suitable opening within said cover $s'$. If desired, said cover $s'$ may be used in connection with the top cover S' and form an additional protection to the opening within the casing. The lower end or nose of the magazine being exposed to an intense heat, requires to be protected or to have said part constructed separate and easily detachable for the purpose of renewal. To accomplish such result the front lower part of said magazine is removed upon a horizontal line, and a corresponding nose, X', fitted to or within the space thus formed. A horizontal flange, Y', extending upward from the outer side and upper edge of the nose, embraces the outer side and lower end of said magazine, while the rear ends of said nose are held in lateral position by means of two vertical flanges, Z', which extend forward from the rear portion of said magazine and embrace said ends. Two lugs, A'', projecting forward from the rear side and lower end of the magazine, fit into corresponding notches formed within the contiguous ends of the nose and insure the vertical position of the latter, while the front side of said nose is held in place by means of a lug, B'', which extends horizontally forward from the lower edge of said magazine through a corresponding opening formed within the upper end of said nose. A nail or pin, C'', passing downward through a suitable opening in the lug B'', locks the nose and magazine firmly together. As thus constructed the nose is easily attached to or removed from the magazine, and, being readily cast and requiring no fitting up, can be renewed at a low rate, as compared with fire-brick or other appliances usually employed for the purpose.

By inclosing the rear side of the fuel-chamber with the diving-flue combustion at that point is retarded and a comparatively small quantity of heat is radiated rearward, while, in order to secure a like result from the heated escaping products of combustion, it is necessary that the same should be thrown toward the front of the stove instead of passing directly to and into said diving-flue, as would naturally be the case. To accomplish this object a $\wedge$-shaped flue-strip, D'', is placed upon or within each side of the stove at the upper end of the diving-flue B', and incloses the space between the same, the magazine, and the casing, so as to intercept the ascending currents of heated gas from the rear portion of the fuel-chamber, and, turning the same forward and downward, cause them to pass to or near the front side of said stove before again passing upward and rearward. This operation does not interfere with the draught of the stove, and results in concentrating at its front side the heat that would otherwise be distributed around its entire surface or principally thrown to the rear. In addition to the above-named advantages secured by this shape of the flue-strips, no ashes can lodge upon their upper surfaces so as to obstruct the draught or prevent the free outward passage of heat. In order that more ready escape may be provided for the gases into the direct draught and diving flues, the rear side of the magazine is extended inward so as to form a recess, E'', which materially increases the space between the rear casing and said magazine without lessening in any great degree the capacity of the latter. The diving-flue B' extends vertically downward from near the upper end of the mica section to and into the rear side of the base where it opens laterally into two side flues, F'', which extend horizontally between the sides of said base and the ash-pit, and vertically between the top base plate B and a sub-base plate, G'', placed below the lower base plate A, which sub-base plate extends horizontally inward from the outer edge of the latter to a point in line with the vertical sides C of said base, and from thence downward and inward, and then horizontally across so as to form a pit or sink, H″, beneath the ash-pit. Two flue-strips, I″, extending vertically between the bottom of the ash-pit and the sub-base plate G″, and from the rear side of the stove forward to within a short distance of the front side of the pit H″, divide the space within said sub-base and form in the center another flue, K″, which, at its front end, opens into the side flues F″ and at its rear end into the back pipe L″, which, extending vertically upward, is connected to or with the cross-pipe L′ in the usual manner. In order that the diving-flue B′ and the center or return-flue K″ may be separated, and the heated escaping products as they pass downward through the former may be diverted equally into the side flues F″, a division-plate, M″, having a ∧-shape, is secured within the base at the rear end of the ash-pit and inclosing the space between the same. The base plate A and the rear side of the side plate C extends upward and inward with its apex at the intersection of said plate C and the upper base plate B. The rearward swell N″ of the side plate C, which receives the lower end of the back pipe L″, commences at the intersection of said side plate and the division-plate M″, which latter part is provided at its rear side with lateral wings that follow the line of said side plate, and inclose all of the rectangular space left between the sloping sides of said flue-strip and said plate. As thus arranged the division-plate M″ causes the descending currents of gases as they leave the diving-flue to be divided and turned outward into the side flues, while it also increases the size of the center bottom flue at its intersection with the back vertical flue. Another advantage obtained by this shape of the division-plate is that it prevents ashes and dust from lodging, and causes them to be thrown outward into the side flues and within reach, so as to be readily removed. It will be seen that, as the outer edge of the base plate A is turned downward, while the sub-base plate G″ extends horizontally outward and is joined to the lower edge of the former, a space is left between their adjacent sides, which forms a part of the base flues and causes the hearth and extended portion of said base-plate A to have a high temperature, so as thereby to largely add to the heating capacity of the stove. The rear side of the casing opposite to the diving-flue is removed, and the opening thus formed inclosed by means of a corresponding plate, O″, said plate being secured in place by means of two lugs, P″, which extend downward from its lower end and engage with the contiguous edge of said casing, while the upper end is provided with a turnkey, Q″, that engages with the casing immediately above the same. The advantages of this removable plate will be easily seen, as it affords ready access to the interior of the diving-flue, for the purpose of attaching an oven or to remove the fastening which secures in place the metal and brick lining of the front side of said flue.

The mica section is provided with two rows of hinged doors, R″, one of which is placed above the upper edge of the fuel-chambers so as to afford a view of the interior of the combustion-chamber, and the other below the upper edge of said fuel-chamber so as to show the grated sides of the same and permit the heat of the burning fuel to radiate directly outward.

Secured upon and extending downward from the lower edge of each door, are two lugs, S″, the inner ends of which are vertical, so as to form, with the bottom of said door, a right-angled space, T″, while the outer and lower edge of each lug inclines upward and outward. The front and rear sides of the lugs S″ are flush with the corresponding faces of the door, while upon the rear side of each lug and immediately adjoining the opening T″, is affixed an ear or lug, U″, having, preferably, a semicircular form upon its rear side. Secured to or upon the door-frame V″ at its lower front edge is a lug, W″, which corresponds, in lateral and vertical dimensions, with the opening or space T″ left between the lugs S″, and when said door is in position fills said space so as to complete the finish of the parts. A suitable opening, extending horizontally through the ears U″ and the lug W″, receives and contains a rod, X″, which connects said parts together and forms an axial bearing, upon which the door turns outward and downward. By properly adjusting the position of the rod X″ with relation to the lower edge of the door-frame, said edge will impinge against the outer face of the lug W″ when the door reaches a horizontal position, and, arresting its further movement, furnish a bearing upon which said door will rest. By this construction the doors and frame are combined without having any portion of the hinge apparent, and without interfering, in any degree, with the ornamentation or finish of the parts, while, at the same time, each portion of said hinge is readily accessible, strong, and durable.

The door is secured in a vertical position by means of a turnkey, which consists of an arm, Y″, secured upon the inward-projecting end of a conical stud, Z″, that fits within a corresponding recess or socket formed within the upper central portion of said door. The outer end of the stud Z″ is flush with and conforms to the surface of the door when the arm Y″ occupies a vertical position, and is provided with a slot, A‴, which receives the flattened end B‴ of the shaker-bar C‴, and enables the latter to turn the said stud and arm. Two studs, D‴ and E‴, placed upon the inner face of the door, engage with the arm Y″ and prevent it from passing downward in one direction beyond a horizontal line, and in an opposite direction but slightly beyond a vertical line, while a third stud, F‴, secured upon the inner face of the door-frame, receives and arrests said arm when it has reached a vertical position upon or against said frame. By this construction of the locking device no portion of the same projects beyond the outer face of the door, nor is the finish of the said door (ornamental or otherwise) interfered with; while as the shaker is always present and not heated, the operation of opening or closing a door is rendered both easy and pleasant.

The mica-frames G''' have such shape as to cause them to conform to the interior face of the door, to which they are attached by means of a lug, H''', that extends rearward from the same through a corresponding opening in said mica frame, and is provided with a vertical opening which receives and contains a nail or pin, I''', all in the usual manner.

In order that the dust and ashes shall not lodge upon the lower bar of the mica frame so as to obstruct the mica, the inner face of said bar is sloped inward and downward at such an angle as to cause the ashes to slide off from the same automatically, by which means the usual cleaning of the micas and frames is rendered unnecessary, and the view of the interior of the stove is not obscured through the carelessness or inattention of those who have it in charge.

In stoves of this class the ash-pit is, necessarily, made small in order that sufficient space may be left for the side flues, in consequence of which construction ashes falling from the grate are liable to pass outside of the ash-pan. This difficulty is overcome by means of a ledge, K''', which extends around the wall of the ash-pit at its upper edge, and projects outward and downward sufficiently to inclose the upper edge of the ash-pan and cause all ashes falling upon said ledge to slide inward entirely within the line of the sides of said pan.

For use in many places facilities for baking small articles upon or within the stove would add materially to the convenience of the same. To accomplish this object I place upon or against the rear side of the stove an oven, L''', which has the general form shown in Figs. 3 and 9, and is provided upon its front and rear upper and lower sides with a sheet-flue, M'''. The back pipe L'' opens into the flue M''' at the upper and lower sides of the oven, so as to cause the heated escaping products of combustion passing upward from the base flues to encircle said oven, and impart to it a certain proportion of their heat. But as a large percentage of the heat originally possesed by said gases is abstracted during their passage through said base flues they would not contain a sufficient quantity of heat, after leaving said flues, to impart to the oven the necessary temperature without the consumption of an extra quantity of fuel. In order to provide for such contingency and enable the oven to be heated by means of a moderate fire, an opening, N,''', is formed in and through the back plate O'', which forms the front side of the outer casing of said oven, at and above the lower side of the flue M''', so as to afford a direct communication between the same and the diving-flue B', and permit the escaping products of combustion to pass directly into said flue M''' without entering the base of the stove. Upon entering the flue M''' from the diving-flue the escaping gases would pass directly upward instead of beneath the oven, and up its outer side, unless their course was changed and controlled by artificial means. To accomplish such result the upper end of the flue M''' is permanently closed by means of a plate, m''', and a damper, O''', is fitted to the opening N''', and hinged to or upon the lower side of the same, so as to swing forward and rest upon or against the front side of the inner casing of the oven, and close all passage to the lower portion of said flue M''', causing the escaping gases to pass through the stove base before entering the oven.

When it is desired to send the heated gases directly into the oven, the damper O''' is turned forward and downward, as shown by dotted lines in Fig. 3, in which position said damper leaves the flue M''' entirely unobstructed, and at the same time partially closes the diving-flue.

Another result obtained by cutting off the front vertical flue M''' is the equalization of heat within the oven, as a sufficient amount is radiated into the same through the back plate O'' to equal the amount received through the upper rear and lower flues.

When the oven is applied the rear side of the diving-flue is preferably inclosed by means of a plate, P''', which corresponds in size and shape to the opening within said flue, but is attached to and forms a part of said oven.

Having thus fully set forth the nature and merits of my invention, what I claim as new is—

1. A stove, having the upper or supply end of its magazine separated from the air of the apartment by means of two covers, between which is a chamber for the escape of gas, when said covers are so combined that the inner cover must be opened by an independent motion before the outer cover can be removed, substantially as and for the purpose specified.

2. An exterior cover for the upper end of a stove-casing, which can only be removed after an interior cover is raised, and which, when thus removed, carries with it said interior cover, substantially as and for the purpose shown.

3. An exterior and an interior cover, so combined and arranged that when the former is moved horizontally the latter is carried in the same direction, substantially as and for the purpose set forth.

4. The covers O' and S', when combined and arranged with relation to the upper end of the casing that when said covers are opened the inner cover is prevented from dropping downward, substantially as and for the purpose shown and described.

5. An exterior and an interior cover for the upper end of the casing, and for the magazine, when so constructed and combined that the closing of the former will permit the latter to close, substantially as and for the purpose specified.

6. The square or rectangular rod R', when combined with the cover Q', substantially as and for the purpose shown.

7. A magazine, provided with a vertically-removable cover, when the opening thus closed is principally in rear of the transverse center of said magazine, substantially as and for the purpose set forth.

8. The latch U', constructed and combined with the cover S' and with the upper end of the casing, substantially as and for the purpose shown and described.

9. The latch U' and lower cover Q', when so arranged that the raising of the latter shall release the former, substantially as and for the purpose specified.

10. The urn T', constructed as described, and combined with the covers Q' and S', and with the lifting-rod R', substantially as and for the purpose shown.

11. A chamber, situated between the cover of the upper end of the magazine and the cover of the stove-casing, and connected with the exit-flue, when said chamber is not connected with the combustion-chamber, substantially as and for the purpose specified.

12. A chamber so arranged above the magazine of a revertible-flue stove that the exit-flue shall produce a constant suction, so as to remove therefrom all escaping gases or entering air, substantially as shown.

13. The constructed openings O' and P', above and below the exhaust-chamber H', substantially as and for the purpose shown and described.

14. The funnel N', provided with the opening O', and so combined with the upper open end P' of the magazine and with the cover Q' as to cause said cover, when being raised, to close for an instant said opening O', substantially as and for the purpose specified.

15. The cross-pipe L' and exhaust-flue K', when constructed and combined substantially as and for the purpose shown.

16. The damper M' corresponding to and combined with the cross-pipe L', substantially as and for the purpose set forth.

17. A damper for closing the direct draught of a stove, when provided with two handles, which extend outward from opposite sides of the same, substantially as and for the purpose shown and described.

18. A magazine having its rear wall curved inward so as to increase the space horizontally between the same and the contiguous portion of the casing, substantially as and for the purpose shown.

19. The flue-strips D", situated at the upper end of the diving-flue B', and combined with the same, the magazine and the casing of the stove, substantially as and for the purpose set forth.

20. The flue-strips D", when constructed with $\wedge$-shaped upper sides, substantially as and for the purpose shown and described.

21. The division-plate M", constructed and combined with the base of the stove, substantially as and for the purpose specified.

22. The removable panel O", constructed and combined with the casing of the stove, substantially as and for the purpose shown.

23. An oven applied to and combined with the rear side of a stove, and connected directly with the diving-flue, so as to cause the heated escaping gases to pass into and through the flue surrounding said oven, instead of entering the base of the stove, substantially as and for the purpose set forth.

24. An oven combined with and arranged upon the rear side of a stove, when said oven is so constructed that by turning a damper the heated escaping products of combustion may be caused to pass from the diving-flue directly into and around said oven, or may be caused to enter the base of said stove and then pass into and around said oven, substantially as and for the purpose shown and described.

25. The extra plate P''' attached to and forming a part of the oven L''' and inclosing the open rear side of the diving-flue, substantially as and for the purpose specified.

26. The lining Q for the upper edge of the fuel-chamber, when combined and arranged with relation to the movable bars N, substantially as and for the purpose shown.

27. The lining Q, constructed in sections, and provided with tenons $q$ and mortises $q'$, substantially as and for the purpose set forth.

28. In combination with the lining Q, provided with the recesses $q''$, the lugs R secured to and extending inward from the casing and containing the pins $r$, substantially as and for the purpose shown and described.

29. The bearing-ring L provided with the sockets M and bearings $m$, in combination with the movable bars N, substantially as and for the purpose specified.

30. The bearing-ring L, constructed as described, and provided with the opening $m'$ within the sockets M, substantially as and for the purpose shown.

31. A movable bar forming a part of the side of a fuel-chamber, when its upper end is provided with a journal having such a relative angle to said bar as to cause it to have a rotary motion within its bearing, when the lower end of said bar is caused to vibrate around the circle of the slag-pit, substantially as and for the purpose set forth.

32. A movable bar forming a part of the side of a fuel-chamber when the axial bearing for its upper end is so arranged as to permit each side of said bar to be alternately thrown forward and back, horizontally as well as radially, when its lower end is vibrated around the circle of the slag-pit, substantially as and for the purpose shown and described.

33. The head or collar $n'$, secured upon the outer end of the journal n, in combination with the same, the bar N and the ring L, substantially as and for the purpose specified.

34. The bars N, provided with the bearings O and lateral flanges o, in combination with the ring G, provided with the openings g, substantially as and for the purpose shown.

35. The bars N, constructed and combined with the ring G, so as to permit of their longitudinal expansion without displacement of parts, as shown and described.

36. The rear movable bar N, provided with the lateral wing n'', substantially as and for the purpose specified.

37. A fuel-chamber capable of a horizontally-rotary motion, in combination with an imperforate horizontally-stationary bed-plate, substantially as and for the purpose shown.

38. The lining C' of the diving-flue B', when constructed and combined therewith, substantially as and for the purpose set forth.

39. The means employed for attaching the lining C' to or upon the flue B', consisting of the lug c' secured to or upon the rear side of said lining, and provided with the pin c'', and projecting through a corresponding opening within the front wall of said flue, substantially as shown and described.

40. The brick or extra lining D', constructed and combined with a metal lining, C', or flue B', substantially as and for the purpose specified.

41. The brick or extra lining D', constructed as shown, and combined with the metal lining C' by means of the downward-projecting end of the magazine and the flanges d or the ledge d', substantially as and for the purpose specified.

42. The nose X', constructed open at the rear, and combined with the magazine E', substantially as and for the purpose set forth.

43. A fuel-chamber capable of a horizontally-rotary motion, and resting upon and wholly or in part supported by balls, substantially as and for the purpose shown and described.

44. The lower cup-bearings I, constructed as shown, and provided within their sockets i with the openings i', substantially as and for the purpose specified.

45. The upper recessed bearings H, provided with the overlapping wings h, substantially as and for the purpose shown.

46. The slag-pit cylinder G, so constructed as to extend below the bed-plate S, substantially as and for the purpose set forth.

47. The axial bearings T and A', of the bed-plate S, when constructed as shown, and resting within the bearings t and w, substantially as and for the purpose shown and described.

48. The combined plate X and bar Y, constructed as shown, and combined with the bed-plate S and slag-pit cylinder G, substantially as and for the purpose specified.

49. The washer Z, provided with the radial arm A', and combined with the bed-plate S and the arms T and U, substantially as and for the purpose shown.

50. The frame-bar W, constructed as shown, and combined with the bed-plate S, substantially as and for the purpose set forth.

51. In combination with the horizontally-pivoted bed-plate S, and frame-bar W, the stud w', substantially as and for the purpose shown and described.

52. The imperforate bed-plate S, having its rear side extended, so as to close the space between the same, and the inner side of the slag-pit G, substantially as and for the purpose shown.

53. A horizontally-stationary bed-plate, provided with a serrated edge, in combination with a fuel-chamber capable of a horizontally-rotary motion, and provided upon its portions contiguous to the edge of said bed-plate with corresponding serrations, substantially as and for the purpose set forth.

54. The projecting ledge K''', upon the sides of the ash-pit V, substantially as and for the purpose shown and described.

55. The doors R'', provided with the lugs S'' and ears U'', which together form the hinge or pivotal bearings for said doors, substantially as and for the purpose specified.

56. The hollow lug W''', of the door-frame, secured upon and extending outward from the side of the casing of the stove, substantially as and for the purpose shown.

57. A mica frame, having its lower bar beveled inward and downward, substantially as and for the purpose set forth.

58. A mica section of dropping doors, situated opposite a basket-grate when the latter is placed above a ring or slag-pit, and all the parts are constructed and combined substantially as and for the purpose specified.

59. The turn-button Y'' and Z'', having its outer portion flush with the surface of the door, substantially as and for the purpose shown.

60. A stove-shaker, provided upon one end with a key for unlocking the turn-button, substantially as set forth.

61. In combination with the arm Y'' of the turn-button, the lugs D''' and E''', secured upon and projecting inward from the door R'', substantially as and for the purpose shown and described.

62. In combination with the turn-button Y'' and Z'', pivoted to or within the door R'', the lug F''', secured to and extending inward from the frame V'', substantially as and for the purpose specified.

In testimony that I claim the foregoing I have hereunto set my hand this 22d day of February, 1872.

WILLIAM J. KEEP.

Witnesses:
  R. EVERINGHAM,
  C. H. HAZARD.